United States Patent [19]

Rinklake et al.

[11] Patent Number: 4,470,406
[45] Date of Patent: Sep. 11, 1984

[54] ROOFING TILE WITH THERMAL CONDUCTION DEVICE

[75] Inventors: Manfred Rinklake, Fridrichsdorf; Wilhelm Roettger, Heusenstamm; Josef Zeibig, Dietzenbach; Guenter Joest, Rodgau, all of Fed. Rep. of Germany

[73] Assignee: Redland Roof Tiles Limited, Reigate, England

[21] Appl. No.: 263,606

[22] Filed: May 14, 1981

[51] Int. Cl.³ ............................................. F24J 3/02
[52] U.S. Cl. .................................. 126/446; 126/450; 126/DIG. 2
[58] Field of Search ................ 126/DIG. 2, 442, 446, 126/447, 448, 449, 450

[56] References Cited

U.S. PATENT DOCUMENTS

| 4,204,520 | 5/1980 | Rosenberg | 126/446 |
| 4,237,861 | 12/1980 | Fayard | 126/DIG. 2 |
| 4,305,385 | 12/1981 | Heuser | 126/449 |
| 4,345,587 | 8/1982 | Carvalho | 126/450 |
| 4,364,374 | 12/1982 | Brazzola | 126/442 |
| 4,377,199 | 3/1983 | Heidtmann | 165/47 |

FOREIGN PATENT DOCUMENTS

| 2829014 | 1/1980 | Fed. Rep. of Germany | 126/DIG. 2 |
| 2911960 | 10/1980 | Fed. Rep. of Germany | 126/DIG. 2 |
| 2936015 | 3/1981 | Fed. Rep. of Germany | 126/DIG. 2 |
| 2455146 | 12/1980 | France | 126/DIG. 2 |

Primary Examiner—Daniel J. O'Connor
Attorney, Agent, or Firm—Young & Thompson

[57] ABSTRACT

A concrete roofing tile (10) has a thermal conduction device in the form of metal sheets (20a, 20b) attached to its underside. Planar metal contacts (30a, 30b) project from the underside of the sheets and are adapted to clip on a pipe (40) which extends up the roof and carries a heat carrier medium. The pipe is part of grid fixed to a roof structure for collecting heat absorbed by the tiles. The tiles have the appearance of ordinary roofing tiles from the outside.

1 Claim, 6 Drawing Figures

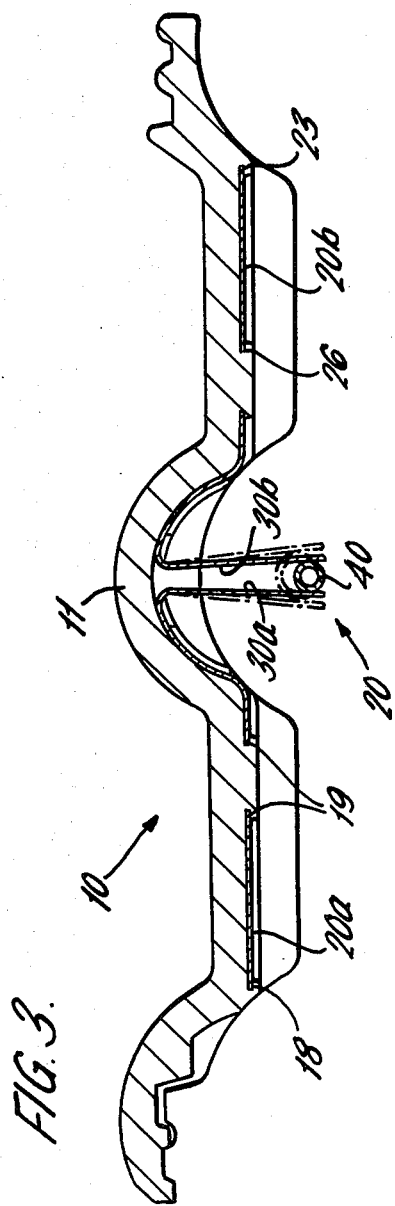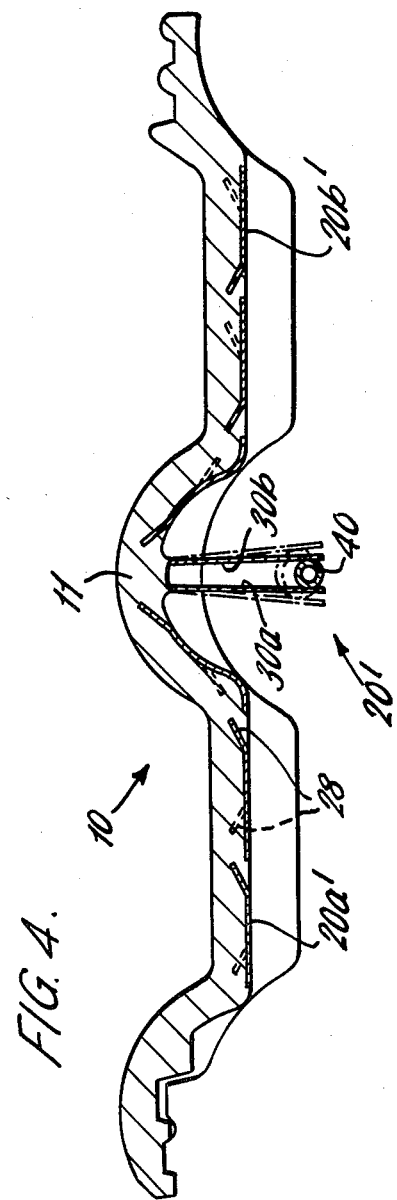

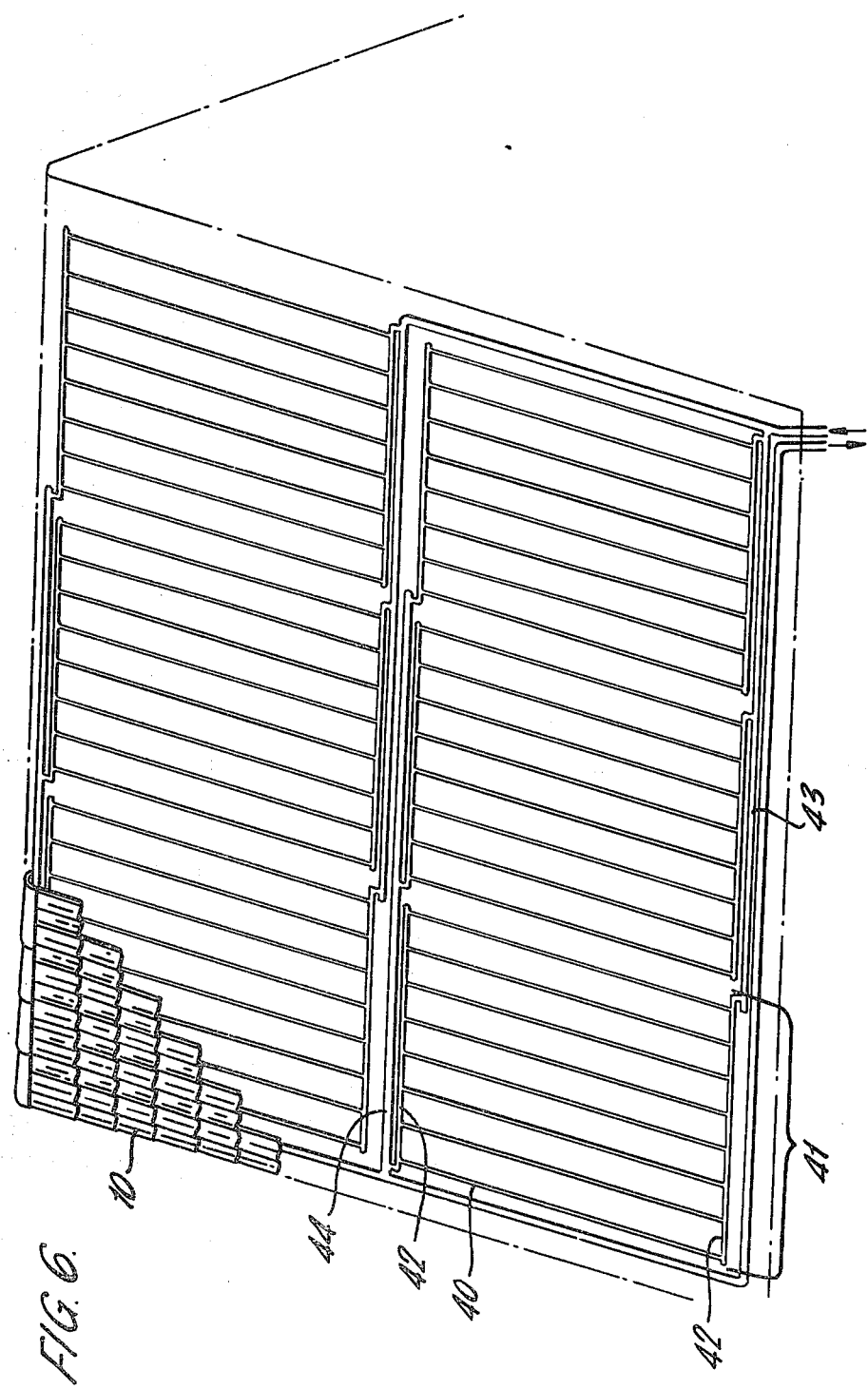

ROOFING TILE WITH THERMAL CONDUCTION DEVICE

The invention concerns a roofing tile, particularly but not exclusively made of concrete or ceramic materials, provided with a thermal conduction device on the underside of the tile.

A known roofing tile of this type (described in German Gebrauchsmuster No. 75 25 656) requires on its underside an homogeneous or sufficiently fine-meshed layer of a material of good thermal conductivity, preferably metal, which transmits the heat created by solar radiation, at low thermal resistance, to a heat transmitting medium. The heat transmitting medium is hereby conducted through a channel enclosed by a material of good thermal conductivity. In this way, each roofing tile has a channel section which, on the covered roof, must be tightly connected to the channel sections of the tile above and below, a process which is obviously expensive, so that the laying of such roofing tiles is not an easy matter.

German Offenlegungsschrift No. 2732758 describes another method whereby the pipes conducting the heat carrier medium are fixed to the roof constuction separately from the roofing tiles. In this case tile-shaped metal elements serve to cover the roof, such elements having at least one longitudinal corrugation to receive the pipes. The corrugation is U-shaped and protrudes on the upper side of the tile-shaped element and has, along most of its length in the upper part, a curvature which corresponds to the curvature of the pipe it receives, as well as side pieces which run inclined to each other and fit to the pipe resiliently, whereby a compression joint is achieved between element and pipe. The height of the corrugation is only slightly greater than the diameter of the pipe, which in case does not create problems, since even in the case of such elements being arranged to overlap or cover, looking in direction of the roof pitch, only insignificant changes in distance occur between the elements and the pipes because the elements are not thick.

However, such a design cannot be transferred to roofing tiles made of concrete or ceramic materials, as, because of the greater thickness of such roofing tiles and the variation of overlap depending on the pitch of the roof, noticeable differences occur in the distance between the overlapped and overlapping areas of the roofing tiles and the pipes resting on the roof construction.

The invention provides a roofing tile comprising a tile body and a thermal conduction device on the underside, in use, of the tile body, in which the thermal conduction device includes at least two generally planar thermally conductive contacts extending away from the tile body the arrangement being such that, in use, the contacts engage the sides of a heat carrier medium pipe fixed to the roof structure for transferring heat to the pipe.

The invention also provides a tiled roof comprising a roof structure and a plurality of roofing tiles hung from the roof structure in which at least one heat carrier medium pipe is fixed to the roof structure and at least one roofing tile comprises a thermal conduction device on its underside, the thermal conduction device including two generally planar thermally conductive contacts extending away from the underside of the tile and engaging the sides of the heat carrier medium pipe to transfer heat to the pipe.

The contacts may be generally plane sheet metal strip between which is clamped.

The roofing tiles according to the invention can be laid in the same manner as conventional roofing tiles. To make laying even easier, the lower corner area of such sheet-metal strip adjacent to a head area of the roofing tile may be bent outwards so that a funnel-like insertion area is formed, ensuring an easy slipping-on of the sheet-metal strips on to the heat carrier pipe and a uniform splay of these strips when laying the tiles.

The thermal conduction device shaped according to the invention requires no significant modification of conventional roofing tiles such as for instance the known concrete roof tiles. In particular the surface of a roofing tile according to the invention cannot be distinguished from the face of corresponding conventional roofing tiles, so that the transmission and utilization of heat originating from solar radiation and the atmosphere is possible without impairing the aesthetic effect. In addition, roofing tiles according to the invention can be laid jointly with conventional roofing tiles without a thermal conduction device, for instance where heat transmission is desired only from certain sections of the roofing such as from the part of a pitched roof receiving more heat on account of the position of the sun.

A preferred embodiment of the invention will now be described, by way of example, with reference to the accompanying drawings, in which:

FIGS. 3 and 4 show two roofing tiles according to FIG. 1 in cross-section with the thermal conduction devices fitted in different ways;

FIG. 6 is a schematic perspective view of a roof partially covered with roofing tiles according to FIGS. 1 or 4, as well as the lay-out and connection of the pipes for the heat carrier medium.

Figure 1:
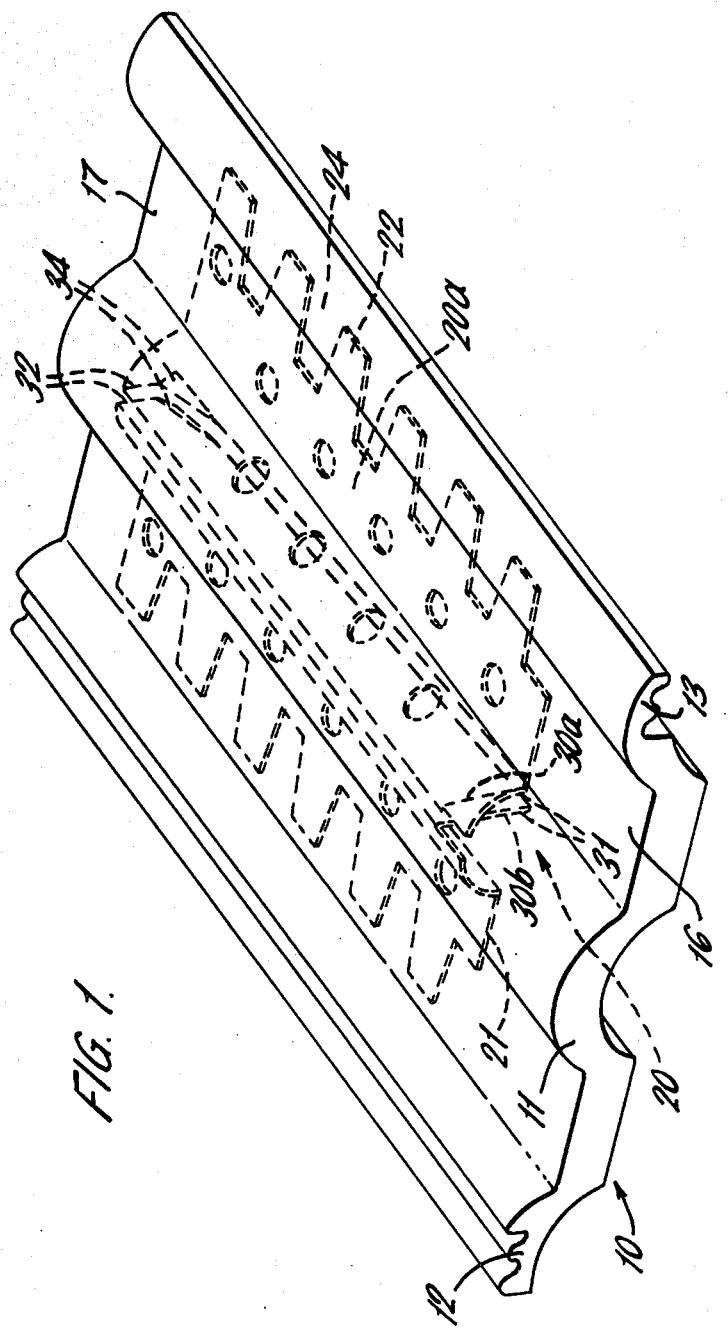
FIG. 1 is a perspective view of a roofing tile in accordance with the invention.

As the basic roofing tile 10 in the examples of embodiment described below serves a concrete tile as described in the German Pat. No. 1609924 and which, as can best be seen in FIG. 1, has a centre roll (11) in longitudinal direction as well as a water lock (12) in the area of the left-hand longitudinal edge and a cover lock (13) in the area of the right-hand longitudinal edge. When laying such roofing tiles (10) the nibs (15) of these, situated underneath the tile on a bar (14) are hung on to the battens (50) (see FIG. 5); the tail (16) area of the tile, provided on the underside with bars, then covers the head (17) area of the roofing tile following immediately in direction of the eaves. Adjacent roofing tiles are connected with one another with the water lock (12) and the cover lock (13).

Figure 2:
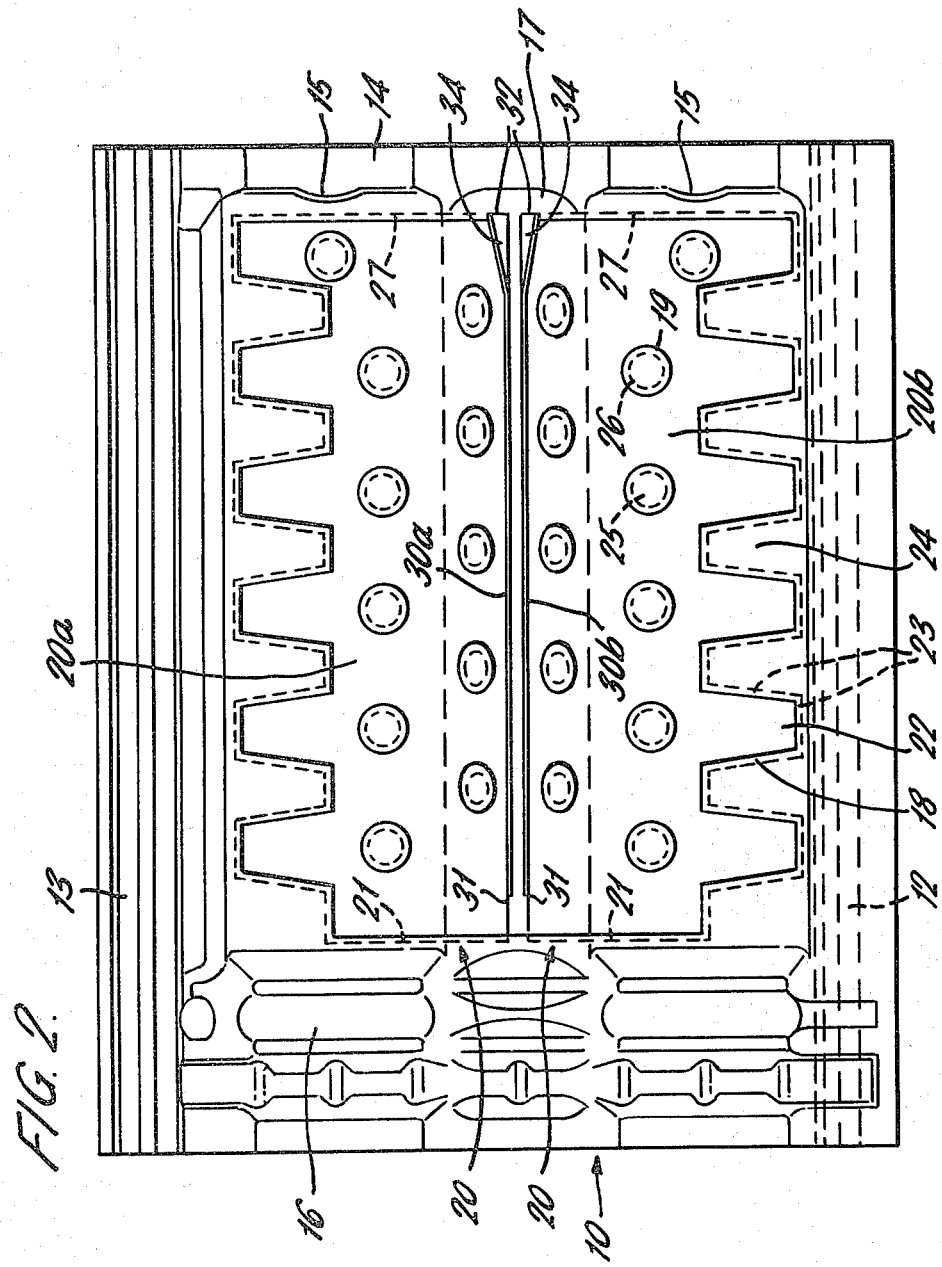
FIG. 2 is a view of the underside of the roofing tile according to FIG. 1.

As can best be seen from FIG. 2, a thermal conduction device (20) with its thermal conduction strips (20*a* and 20*b*) is located outside the water and cover lock (12, 13) areas and the hanging bar (14) and the tail area (16), so that the presence of the thermal conduction device does not affect the laying of such roofing tiles.

The use of roofing tiles in accordance with the invention, which have a centre roll, is particularly practical, as the pipe conducting the heat carrier medium can run underneath the centre roll without hindering the arrangement of the roofing tiles and without requiring recesses on the battens. However, the invention is not limited to this specific embodiment; it can be applied also to other roofing tiles such as concrete tiles of a different profile, clay tiles, asbestos-cement slates, plastic roofing tiles and such like.

As can best be seen from FIGS. 3 and 4, contacts in the form of plane sheet-metal strips (30a, 30b) project from the thermal conduction sheets (20a, 20b or 20a', 2b', respectively) which form the thermal conduction device (20 or 20' respectively). These sheet-metal strips serve to transmit the heat on to the pipe (40) containing the heat carrier medium and are located in the centre roll (11) area of the roofing tile (10) on the thermal conduction sheets, whereby a simple connection can be made to the pipe. The sheet-metal strips (30a and 30b) extend on both sides of the axis of the thermal conduction device (20 or 20' respectively), at an equal distance from the device and basically over the total length of the thermal conduction device, whereby a uniform heat transmission is achieved. As can be seen from FIGS. 1, 2 and 5, only the side (13) of the sheet-metal strips facing the tail area (16) of the tile (10) is set back from the corresponding edge (21) of the thermal conduction sheet, thereby preventing a bending of the sheet-metal strips in this area when a roofing tile is laid on to the following roofing tile below.

The sheet-metal strips (30a and 30b) may be of the same material as the thermal conduction sheets (30a and 20b) or of another material with good thermal conductivity. Preferably the sheet-metal strips consist of a 0.4 to 0.6 mm thick copper sheet.

Figure 5:
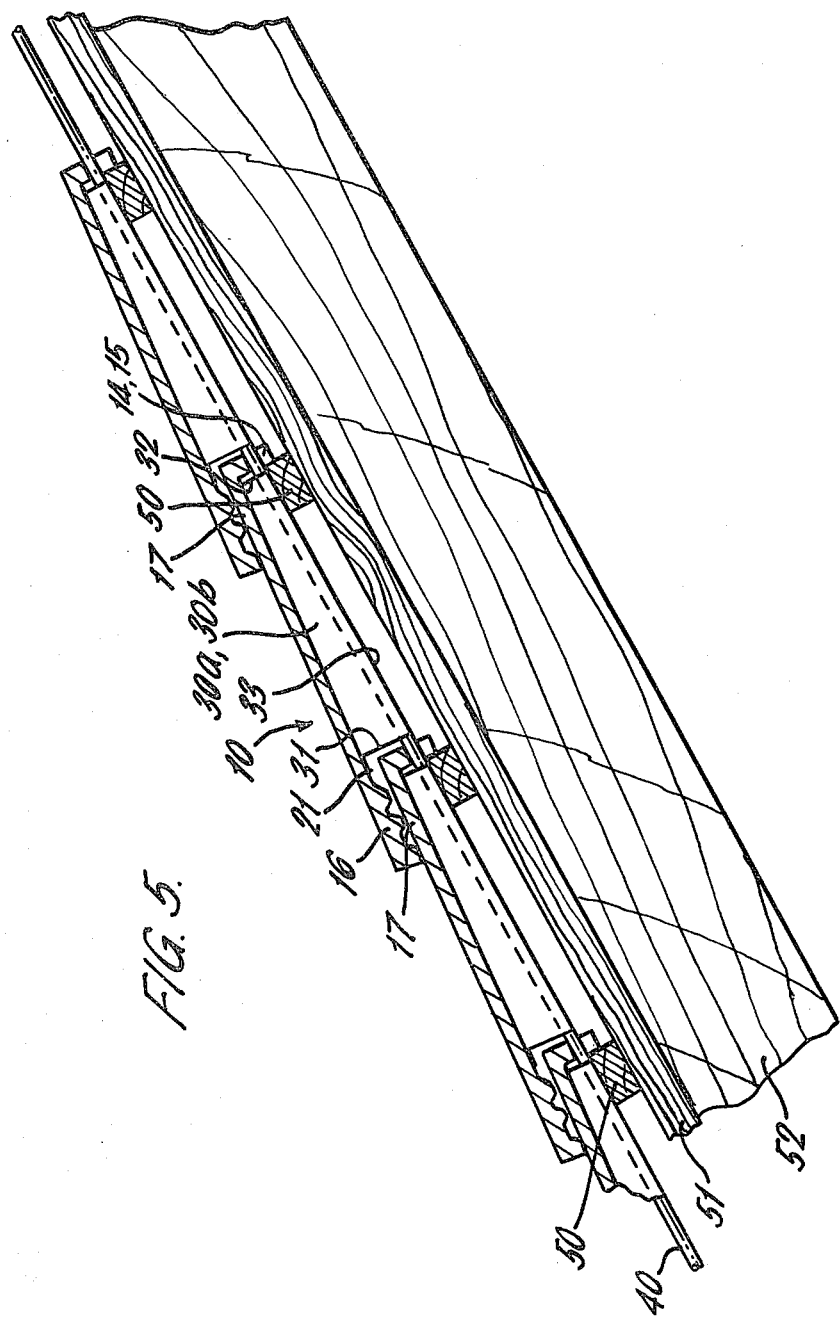
FIG. 5 shows part of a pitched roof with roofing tiles according to FIGS. 1 or 4 in longitudinal section and a pipe arranged beneath it for the heat carrier medium.

FIG. 5 shows that the side (31) of the sheet-metal strips (30a and 30b) facing the tail area (16) of the roofing tile (10) must be higher than the side (32) facing the head area (17) of the tile to ensure a secure contact between the longitudinal edges (33) of the sheet-metal strips and the pipe (40). Accordingly, each sheet-metal (30a, 30b) is of a trapezoid shape, the longer of the two parallel sides being adjacent to the tail area of the roofing tile.

From FIGS. 3 and 4 can be seen, that the thermal conduction sheets (20a and 20b or 20a' and 20b' respectively) have in the centre roll (11) area of the roofing tile (10) a bead which is quarter-circular in cross-section, from the upper edge of which a sheet-metal strip (30a or 30b) projects downwards. The thermal conduction sheet and the sheet-metal strips belonging to it are made of one piece and can be manufactured simply by bending sheet-metal parts. Since the thermal conduction sheets are touching the roofing tile also in the centre roll, a good heat conducting connecting is achieved between these parts.

As mentioned, the sheet-metal strips (30a and 30b) provided in accordance with the invention serve to transmit the heat from the corresponding thermal conduction sheets (20a, 20b or 20a', 20b' respectively) on to a pipe (40) containing the heat carrier medium. In practice such pipes have a diameter of 6 to 12 mm. The sheet-metal strips are slipped on to the pipe (40) like clamps. The arrangement is to be made in such a way that the metal-sheet strips are in firm contact with the outer wall of the pipe to ensure good heat transfer. For this purpose the two sheet metal strips (30a and 30b) have to extend largely parallel with only a small splay as is illustrated in FIGS. 3 and 4 for the smaller pipe diameter. The distance between the two sheet-metal strips in the area of contact with the thermal conduction sheets should not be greater than 5 mm, preferably less, so that a good contact with the outer wall of the pipe is ensured even with pipes of the smallest diameter normally available. The sheet-metal strips can be slipped on to pipes with a larger outer diameter without any problem, as the strips can be easily bent in the area where they join the relevant thermal conduction sheet, as is indicated by the dotted line.

Alternatively, by way of modification of the configuration illustrated in FIGS. 3 and 4, the two sheet-metal strips (30a, 30b) may touch each other in the area where they join the thermal conduction sheets (20a and 20b or 20a' and 20b' respectively), while their lower sections point away from each other. In each case the lower areas of the sheet-metal strips (30a and 30b) must formed so that they can be resiliently splayed.

As can be seen from FIGS. 1 and 2, it is also envisaged, to facilitate the slipping on of the sheet-metal strips (30a and 30b) to the pipe (40), for the lower corner area (34) of each strip adjacent to the head area (17) of the roofing tile (10) to be bent outward. In this way a kind of fitting aid is created which allows an easy insertion of the pipe between the two sheet-metal strips during the laying of the roofing tiles.

As regards the fastening of the thermal conduction sheets to the underside of the roofing tiles in accordance with the invention, the sheets can be anchored in a simple way directly into the tile for instance during the manufacture of concrete tiles, if, as in the specific embodiment illustrated in FIGS. 1 to 3, the outer edges (21, 23, 27) of the thermal conduction sheets (20a, 20b) are embedded in the concrete. For this purpose recesses are made on the mould or pallet used in the manufacture of concrete tiles underneath the outer edges of the thermal conduction sheets. After placing the thermal conduction sheets in a mould modified in this way, the fresh concrete, filled into the mould and compacted, pours also into the recesses underneath the edges of the thermal conduction sheets, so that these edges are bordered by a concrete band (18) or embedded in the same. After the setting and curing of the concrete, the thermal conduction sheets are attached firmly and permanently to the underside of the roofing tile (10).

It can be seen from FIGS. 1 and 2 that the longitudinal edge of the thermal conduction sheets (20a and 20b) which is situated away from the sheet-metal strips (30a and 30b) has consecutive trapezoid projections (22) and corresponding recesses (24).

Furthermore, it is envisaged to fasten the thermal conduction sheets (20a and 20b) to the roofing tile (10) not only along their outer edges (21, 23 and 27), but also in the area of the sheet face. For this purpose a number of round apertures (25) are provided in the thermal conduction sheets, the edges (26) of which are also bordered with concrete bands (19), by means of corresponding recesses in the mould, achieving in this way an altogether secure and, as regards the heat transfer, favourable fastening of the thermal conduction sheets to the underside of the roofing tile.

FIG. 4 illustrates a further possibility of fastening the thermal conduction sheets (20a' and 20b') to the roofing tile (10). In this instance anchoring sections (28), partly stamped out and bent upwards, are provided in the thermal conduction sheets, these sections being surrounded by the filled-in concrete, after the sheets have been placed in a normal mould, and permanently embedded in it after the curing of the concrete.

Both possibilities explained and cited by way of example for fastening the thermal conduction sheets to the roofing tile require either no or only insignificant modifications of the moulds for manufacturing concrete roof tiles, so that the roofing tiles provided in accordance with the invention with a thermal conduction device can be manufactured with conventional tile-making plants.

FIG. 5 shows the fastening of roofing tiles (10) to a roof construction in longitudinal section. For this purpose battens (50) are fixed over counter battens (51) to rafters (52). The pipes (40) for the heat carrier medium, which run in direction of the roof pitch, are fixed at intervals to the battens by clips. The roofing tiles hang on the battens (50) in the usual way with their nibs (15) located on the hanging bars (14). The underside of the tail area (16) of the roofing tile lies on the upper side of the head area (17) of the next roofing tile below and provides there a seal against the penetration of water, snow and dust. The trapezoid sheet-metal strips (30a and 30b or 30a' and 30b' respectively) project downward from the thermal conduction sheets (20a and 20b or 20a' and 20b' respectively) situated on the underside of the roofing tile 10, and contact the pipe (40) on both sides somewhat above their longitudinal edges (33).

FIG. 6 is a diagrammatic view of the configuration of the pipes (40) on the roof construction of a pitched roof. In this case eight pipes (40) at a time are arranged parallel to each other in direction of the roof pitch forming a pipe grid (41) and are connected with corresponding transverse pipes (42) running parallel to the eaves or to the ridge. The transverse pipes (42) for their part are connected with the feed pipes (43) at the eaves and with the return pipes (44) for the heat carrier medium at the ridge. The width and length of the individual pipe grids (41) is variable and can be chosen according to the energy requirement and local conditions. In the upper left area of the illustration according to FIG. 6, the roofing with tiles (10) in accordance with the invention is indicated. As has been explained with reference to FIG. 5, the roof can be covered with the roofing tiles in accordance with the invention in the customary manner. Provided the distance between two adjacent pipes (40) is adjusted to the distance between the sheet-metal strips (30a, 30b) of adjacent roofing tiles (10), the pipe (40) concerned is clamped between the sheet-metal strips when laying the roofing tiles, whereby the heat transfer on to the pipe containing the heat carrier medium is ensured.

One advantage of the roofing tiles described above is that they ensure good heat transfer on to a heat carrier medium without significantly affecting the ease of laying, and are tiles the face of which cannot be distinguished from conventional roofing tiles.

Another advantage is that the pipes conducting the heat carrier medium are separated from the roofing tiles. In this case the pipes, fixed to the roof construction and running in direction of the roof pitch, are arranged parallel to each other in such a way that, when covering the roof with the roofing tiles according to the invention, the sheet-metal strips projecting from the heat conduction device can be slipped on to the pipes.

We claim:

1. A roofing tile comprising a tile body and a thermal conduction device on the underside, in use, of the tile body in which the thermal conduction device, comprises thermal conduction sheets including partly stamped out and bent up anchoring sections and edge portions which are embedded into the tile body for securing the sheets to the underside of the tile body, the sheets including on one longitudinal side beads of quadrant shape from which two generally planar sheet-metal contact strips protrude facing each other and extending downwards away from the tile body, the contact strips extending basically over the whole length of the tile body and being generally trapezoidal with the longer of the two parallel sides adjacent a tail area of the tile and with the ends of the contacts facing the tail area of the tile being set back from the corresponding edges of the thermal conduction sheets, lower corner areas of the contact strips adjacent to a head area of the tile being bent outward and the contact strips being resiliently splayable for the purpose of slipping them onto a heat carrier medium pipe so that, in use, the contact strips engage both sides of the heat carrier medium pipe which is fixed to the roof structure for transferring heat to the pipe.

* * * * *